United States Patent
Yeon et al.

(10) Patent No.: US 12,487,449 B2
(45) Date of Patent: Dec. 2, 2025

(54) LASER DEVICE AND METHOD OF ALIGNING LASER DEVICE

(71) Applicant: Samsung Display Co., LTD., Yongin-si (KR)

(72) Inventors: Seong Jin Yeon, Yongin-si (KR); Voronov Alexander, Yongin-si (KR); Jun Ho Park, Yongin-si (KR); Je Kil Ryu, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 451 days.

(21) Appl. No.: 18/074,721

(22) Filed: Dec. 5, 2022

(65) Prior Publication Data

US 2023/0324679 A1     Oct. 12, 2023

(30) Foreign Application Priority Data

Apr. 12, 2022 (KR) ........................ 10-2022-0045027

(51) Int. Cl.
    *G02B 26/12*        (2006.01)
    *G02B 26/04*        (2006.01)
    *G02B 26/10*        (2006.01)

(52) U.S. Cl.
    CPC ........... *G02B 26/128* (2013.01); *G02B 26/04* (2013.01); *G02B 26/101* (2013.01); *G02B 26/121* (2013.01); *G02B 26/123* (2013.01); *G02B 2207/117* (2013.01)

(58) Field of Classification Search
None
See application file for complete search history.

(56) References Cited

U.S. PATENT DOCUMENTS

| | | | |
|---|---|---|---|
| 6,720,519 B2 | 4/2004 | Liu et al. | |
| 7,006,237 B2 | 2/2006 | Iwata | |
| 2003/0102291 A1* | 6/2003 | Liu | ...................... B23K 26/073 219/121.75 |
| 2004/0105092 A1* | 6/2004 | Iwata | ................... B23K 26/032 356/237.2 |
| 2008/0094604 A1* | 4/2008 | Shibazaki | ........... G03F 7/70758 355/72 |
| 2011/0134254 A1* | 6/2011 | Hulsken | ............. G01M 11/0264 348/E17.002 |
| 2020/0249317 A1 | 8/2020 | Cao et al. | |
| 2021/0165101 A1 | 6/2021 | Ikeoh et al. | |

FOREIGN PATENT DOCUMENTS

| | | | |
|---|---|---|---|
| KR | 20050074192 A | * | 7/2005 |
| WO | 00/53365 | | 9/2000 |
| WO | 2011/116968 | | 9/2011 |

* cited by examiner

*Primary Examiner* — Ryan Crockett
(74) *Attorney, Agent, or Firm* — CANTOR COLBURN LLP

(57) ABSTRACT

A laser device includes a light source part; an optical path adjustment part; a light distribution part that splits a laser beam into a plurality of sub-beams to a substrate; a drive part that moves the light distribution part and adjusts relative positions between the light distribution part and the substrate; a sensing part; and a control part. The control part generates an image based on a signal sensed by the sensing part and measures an image contrast of the image. The control part records and compares a plurality of image contrasts according to the position of the light distribution part to determine an optimal position of the light distribution part.

20 Claims, 16 Drawing Sheets

LASER DEVICE AND METHOD OF ALIGNING LASER DEVICE

CROSS-REFERENCE TO RELATED APPLICATION

This application claims priority to and benefits of Korean Patent Application No. 10-2022-0045027 under 35 U.S.C. § 119, filed on Apr. 12, 2022, in the Korean Intellectual Property Office (KIPO), the entire contents of which are incorporated herein by reference.

BACKGROUND

1. Technical Field

The disclosure relates to a laser device and a method of aligning the laser device, which is capable of improving efficiency and reliability.

2. Description of the Related Art

As the information society develops, the demand for display devices for displaying images is increasing in various forms. For example, the display devices are applied to various electronic devices such as smart phones, digital cameras, notebook computers, navigation systems, and smart televisions. The display devices may include display panels such as liquid crystal display devices, field emission display devices, and light emitting display devices.

The display devices applied to various electronic devices require various functions and designs. For example, in order to increase a display area, a display device has a through hole in a display area of a display panel, and an optical sensor such as a camera sensor and an infrared sensor is disposed in the through hole.

The through hole of the display panel may be formed using a laser device that outputs a laser beam.

The laser device is a device for cutting a material, forming a pattern, and performing a welding process or the like using the laser beam. The laser beam used in the laser processing has the characteristics of strong directivity and a high density. In particular, a high-power laser can be used for processing a display panel because it does not affect the surroundings and precision processing is possible.

The laser device may include a laser light source part for outputting a laser beam, a laser irradiation part composed of a scanner for adjusting an irradiation position of the output laser beam and an F/Theta lens for condensing the laser beam having a fixed irradiation position, a stage on which a target to be processed is aligned, and the like.

In the laser device, a scanning line of the laser beam is defined by the scanner.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

Embodiments provide a laser device capable of aligning a plurality of sub-beams irradiated to a substrate in a short time and improving a tolerance with a simple structure to improve efficiency and reliability.

Embodiments also provide a method of aligning a laser device capable of aligning a plurality of sub-beams irradiated to a substrate in a short time and improving tolerance by a simple method.

However, embodiments of the disclosure are not limited to those set forth herein. The above and other embodiments will become more apparent to those of ordinary skill in the art to which the disclosure pertains by referencing the detailed description of the disclosure provided below.

An embodiment of a laser device includes a light source part that emits a laser beam; an optical path adjustment part that reflects the laser beam emitted from the light source part and adjusts an irradiation direction of the laser beam; a light distribution part that splits the laser beam reflected from the optical path adjustment part into a plurality of sub-beams and irradiates the plurality of sub-beams to a substrate; a drive part that moves the light distribution part and adjusts relative positions between the light distribution part and the substrate; a sensing part that senses the plurality of sub-beams emitted from the substrate; and a control part that adjusts an arrangement of the optical path adjustment part and moves the drive part to adjust an arrangement of the light distribution part. The control part generates an image based on a signal sensed by the sensing part and measures an image contrast of the image. The control part records and compares a plurality of image contrasts according to the position of the light distribution part to determine an optimal position of the light distribution part.

The drive part may move the light distribution part in a first movement axis and a second movement axis. The control part may perform a process of generating the image at a first point on the first movement axis of the light distribution part and measuring the image contrast; generating the image at a second point on the first movement axis and measuring the image contrast; generating the image at a third point on the first movement axis and measuring the image contrast on all points on the first movement axis, and repeatedly performs the process in the second movement axis.

The control part may complete the measurement of the plurality of image contrasts on the plurality of points on the first movement axis and the second movement axis of the light distribution part. The control part may determine the optimal position of the light distribution part.

The control part may determine points of the plurality of points having a maximum image contrast value within the first movement axis and the second movement axis of the light distribution part as the optimal position of the light distribution part on the first movement axis and the second movement axis, respectively.

The laser device may further include an f-theta lens disposed between the optical path adjustment part and the light distribution part and adjusting a focus of the laser beam.

The control part may adjust the arrangement of the optical path adjustment part and adjusts positions of the plurality of sub-beams irradiated to the substrate in a raster scan method.

The substrate may include reference patterns in which patterns having a same shape are periodically arranged on a surface of the substrate.

The substrate may be included in a flat panel display.

The control part may adjust an intensity of the laser beam emitted by the light source part.

The light source part may emit a first laser beam and align the light distribution part. The light source part may emit a second laser beam having a greater intensity than an intensity of the first laser beam for laser processing the substrate.

The light distribution part may split the first laser beam into a plurality of sub-beams. An intensity of each of the plurality of sub-beams of the first laser beam may be smaller than or equal to a damage threshold of the substrate.

The light distribution part may include a refraction beam splitter. The optical path adjustment part may include a galvanometer or a polygonal mirror scanner.

The sensing part may sense a sub-beam of the plurality of sub-beams reflected from the substrate.

The sensing part may include a photodiode that senses the sub-beam of the plurality of sub-beams.

The sensing part may sense a sub-beam of the plurality of sub-beams transmitted through the substrate.

An embodiment of a method of aligning a laser device includes adjusting a position of a light distribution part according to a signal of a control part by a drive part; detecting a plurality of sub-beams transmitted through or reflected from a substrate by a sensing part; recording signals detected by the sensing part for each position of the light distribution part; generating an image based on the signals recorded by the control part; and measuring a difference in brightness between a brightest portion and a darkest portion of the image and recording an image contrast by the control part.

The method may further comprise after the recording of the image contrast, recording a plurality of image contrasts for all positions of the light distribution part by repeatedly performing the adjusting of the position of the light distribution part, the detecting of the plurality of sub-beams, the generating of the image, and the recording of the image contrast.

The method may further comprise after the recording of the plurality of image contrasts for the all positions of the light distribution part, moving the light distribution part to a position having a maximum image contrast value of the plurality of image contrasts.

The adjusting of the position of the light distribution part may include repeating a process of sequentially moving the light distribution part in a movement axis among a plurality of movement axes of the light distribution part; and sequentially moving the light distribution part in a next movement axis among the plurality of movement axes of the light distribution part by the drive part.

The plurality of movement axes may include a distance movement axis that adjusts a distance between the light distribution part and the substrate, and an angular movement axis that adjusts an angle between the light distribution part and the substrate.

According to a laser device and a method of aligning the laser device according to embodiments, an alignment time of a plurality of sub-beams irradiated to a substrate may be decreased, and a tolerance on the alignment of the sub-beam may be improved.

The effects according to embodiments are not limited to the above-described contents, and more various effects are included in the specification.

BRIEF DESCRIPTION OF THE DRAWINGS

Additional appreciation according to the disclosure will become more apparent by describing in detail the embodiments thereof with reference to the accompanying drawings, wherein.

DETAILED DESCRIPTION OF THE EMBODIMENTS

Figure 1:
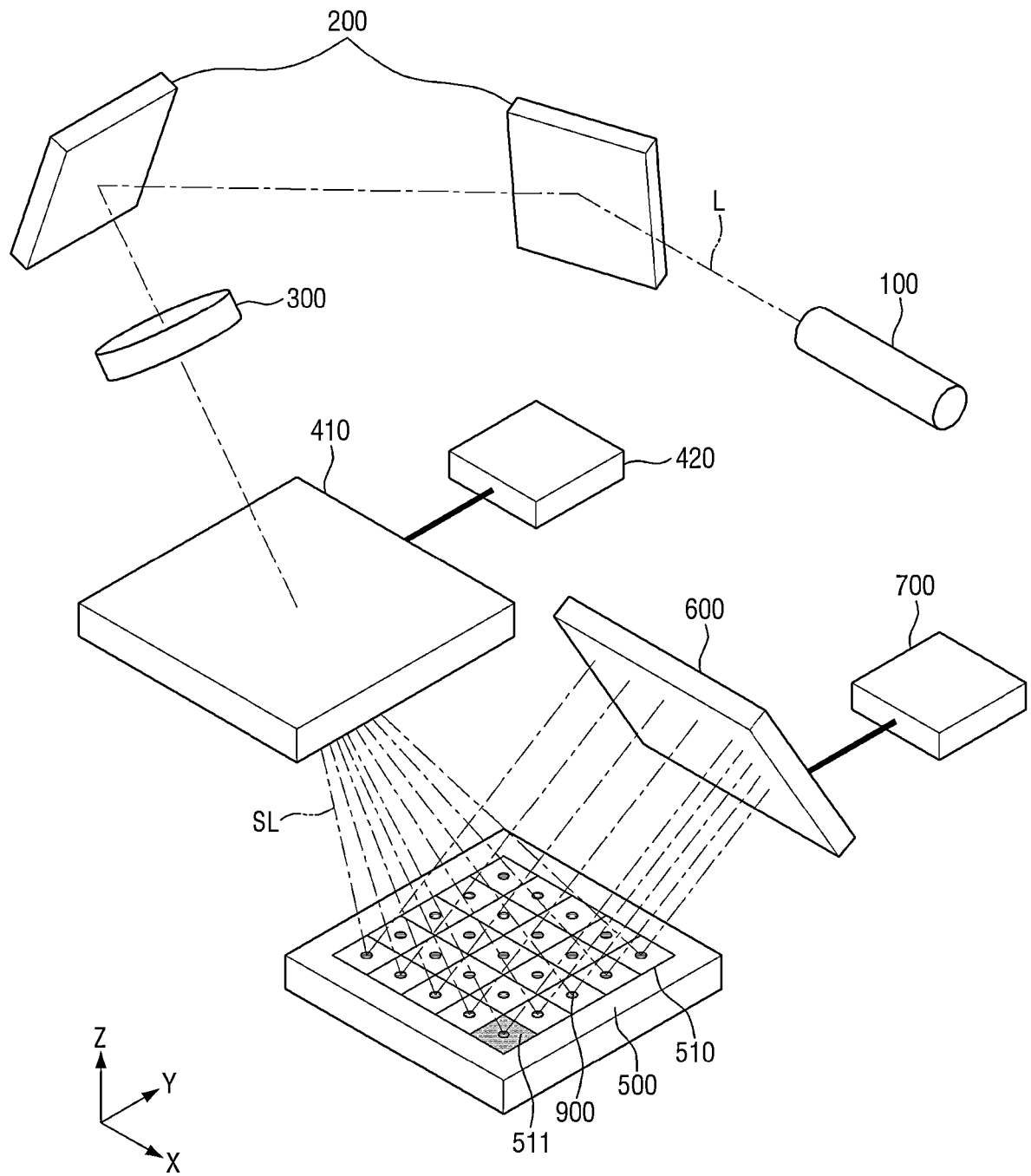
FIG. 1 is a schematic perspective view of a laser device according to an embodiment.

In the following description, for the purpose of explanation, numerous specific details set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The disclosure will now be described more fully hereinafter with reference to the accompanying drawings, in which some embodiments of the disclosure are shown. This disclosure may, however, be embodied in different forms and should not be construed as limited to the embodiments set forth herein. Rather, these embodiments are provided so that this disclosure will be more thorough and complete, and will convey the scope of the invention to those skilled in the art. The same reference numbers indicate the same components throughout the specification. In the attached figures, the thickness of layers and regions may be exaggerated for clarity.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

It will be understood that, although the terms first, second, and the like may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments are described with reference to the accompanying drawings.

FIG. 1 is a schematic perspective view of a laser device according to an embodiment.

Referring to FIG. 1, the laser device according to an embodiment may include a light source part or light source unit 100, an optical path adjustment part 200, an f-theta lens 300, a light distribution part or light distribution unit 410, a sensing part or sensing unit 600, and a control part or control unit 700.

The optical path adjustment part 200 may be disposed in a direction of a laser emission portion of the light source part 100. The f-theta lens 300 may be disposed in a direction of an emission portion of the optical path adjustment part 200. The light distribution part 410 may be disposed in a direction of an emission portion of the f-theta lens 300. A substrate 500 may be disposed in a direction of an emission portion of the light distribution part 410. The sensing part 600 may be disposed in a path of a laser beam L (e.g., sub-beam SL) transmitted through (or reflected from) the substrate 500.

The light source part 100 may emit the laser beam L. The light source part 100 may emit the laser beam L having various intensities. A laser beam L having a weak intensity may be emitted in an alignment process of the laser beam L, and a laser beam L having a strong intensity may be emitted in a processing process (e.g., laser processing). The laser beam L emitted in the alignment process may be lower than a damage threshold of the substrate 500. Accordingly, even in case that the laser beam L is irradiated to the substrate 500 in the alignment process, the substrate 500 may not be affected (or damaged) by the laser beam L.

The laser beam L emitted by the light source part 100 in the processing may be an ultra-short pulse type laser having a pulse duration of picoseconds or femtoseconds.

The ultra-short pulse type laser may have a very high energy density and may process targets made of various materials, and physical deformation, chemical deformation, or a reduction in processing precision due to heat diffusion may not occur during the processing of the target. Since the ultra-short pulse type laser produces almost no by-products such as particle stacking or craters by processing, an operation of removing by-products such as ultrasonic cleaning can be omitted.

The ultra-short pulse type laser may also process materials having a high heat transfer coefficient or materials having a low light absorption rate. The ultra-short pulse type laser may readily process a target to be processed in which two or more materials are mixed and a target to be processed made of a multi-layered composite material by a single process. The laser beam L may be the above-described ultra-short pulse type laser. However, the disclosure is not limited thereto, and the laser beam L may be of various types. For example, the laser beam L may be a pulse type laser having a pulse duration of nanoseconds or a continuous wave laser. The laser beam L for alignment and the laser beam L for processing may be the same except for intensity thereof.

The optical path adjustment part 200 may be positioned on a path of the laser beam L emitted from the light source part 100 and change the path of the laser beam L. The optical path adjustment part 200 may include a galvanometer. Accordingly, the optical path adjustment part 200 may include a first galvanometer and a second galvanometer. The first galvanometer and the second galvanometer of the optical path adjustment part 200 may be configured as rotatable reflective mirrors and irradiate the laser beam L within a certain angular range by a rotation of the mirrors. The arrangements of the first galvanometer and the second galvanometer may be adjusted by the control part 700.

The laser beam L emitted from the light source part 100 may be reflected from the first galvanometer at an angle (e.g., a predetermined or selectable angle). When the first galvanometer rotates around an axis, an incident angle of the laser beam L with respect to a reflective surface of the first galvanometer may be changed. Thus, a path of the reflected laser beam L may be determined.

The laser beam L reflected from the first galvanometer may be reflected from the second galvanometer at an angle (e.g., a predetermined or selectable angle). A rotation axis of the second galvanometer may be positioned in a direction intersecting (or crossing) a rotation axis of the first galvanometer. According to the rotation of the second galvanometer, an incident angle of the laser beam L with respect to a reflective surface of the second galvanometer may be changed, and a path of the reflected laser beam L may be determined. Accordingly, the first galvanometer and the second galvanometer may rotate and determine an irradiation angle of the laser beam L, and adjust a position of a focus of the laser beam L formed on the substrate 500.

In case that the substrate 500 is positioned on an XY plane in a three-dimensional space consisting of an X-axis, a Y-axis, and a Z-axis, the first galvanometer may adjust an X-axis position of the focus of the laser beam L formed on the substrate 500, and the second galvanometer may adjust a Y-axis position of the focus of the laser beam L formed on the substrate 500.

Although it is described that the first galvanometer adjusts an X-axis irradiation position of the laser beam L and the second galvanometer adjusts a Y-axis irradiation position, the first galvanometer may also adjust the Y-axis position and the second galvanometer may also adjust the X-axis position. The optical path adjustment part 200 may also adjust the positions of the focuses on the X-axis and the Y-axis at once using a galvanometer without multiple galvanometers.

The control part 700 may adjust the path of the laser beam L by adjusting the arrangements of the first galvanometer and the second galvanometer. The control part 700 may move a position of a sub-beam SL irradiated to the substrate 500 in a raster scan method by adjusting the arrangements of the first galvanometer and the second galvanometer. For example, multiple sub-beams SL may be irradiated to the substrate 500 by repeating a process of moving the sub-beams SL together in a second direction from each original position, a process of moving the sub-beams SL together in a first direction at a distance (e.g., certain or selectable distance), a process of moving the sub-beams SL together in the second direction, a process of moving the sub-beams SL together in the first direction again by a distance twice the distance of the previous process from the original positions, and a process of moving the sub-beams SL together in the second direction. Through these processes, an area (e.g., a specific or selectable area) on the substrate 500 may be scanned with the sub-beam SL.

Although the two galvanometers (e.g., the first and second galvanometers) are shown in the drawing, the disclosure is not limited thereto. For example, in some embodiments, the optical path adjustment part 200 may include a mirror, and the laser beam L incident on the optical path adjustment part 200 may be reflected by the mirror to adjust the path. In other embodiments, the optical path adjustment part 200 may include three or more mirrors, and the path of the laser beam L incident on the optical path adjustment part 200 may be adjusted through the three or more mirrors. Although the optical path adjustment part 200 includes the galvanometer, the disclosure is not limited thereto. For example, the optical path adjustment part 200 may include a polygonal mirror scanner.

The movement of the optical path adjustment part 200 may be synchronized with the emission of the laser beam L of the light source part 100.

The laser beam L reflected from the optical path adjustment part 200 may be incident on the f-theta lens 300.

The f-theta lens 300 may be various f-theta lenses 300 composed of one or more lenses. The f-theta lens 300 may focus the laser beam L on an area to be irradiated to the substrate 500 by adjusting (or constantly adjusting) a focal distance of the laser beam L reflected from the optical path adjustment part or optical path adjustment unit 200. Accordingly, it is possible to constantly adjust the focal distance of the laser beam L regardless of the incident position of the laser beam L. For example, the f-theta lens 300 may adjust the laser beam L that is incident thereon, and the focus of the laser beam L incident on the substrate 500 may be positioned on the substrate 500.

The laser beam L transmitted through the f-theta lens 300 may be incident on the light distribution part 410.

The light distribution part 410 may split (or divide) the incident light into split lights. Accordingly, the laser beam L incident on the light distribution part 410 may be split into the sub-beams SL. In the drawing, although it is shown that one laser beam L is split into 25 (e.g., 5 columns×5 rows) sub-beams SL in case that the laser beam L is incident on the light distribution part 410. However, the disclosure is not limited thereto. For example, the incident laser beam L may be split into 24 or smaller sub-beams SL, or may also be split into 26 or more sub-beams SL. However, the laser beam L may be split into at least two or more sub-beams SL. The light distribution part 410 may split the incident laser beam L into the multiple sub-beams SL and adjust the multiple laser beams L (or the multiple sub-beams SL) at once. Thus, the efficiency of the alignment of the laser beam L and the process using the laser beam L may be improved.

The light distribution part 410 according to the embodiment may diffract incident light. For example, the light distribution part 410 may be a diffraction optical element (DOE) or a diffraction beam splitter. Detailed description of the emission direction and the number of laser beams L incident on the light distribution part 410 is provided below with reference to FIGS. 3 to 6.

The laser beam L transmitted through the light distribution part 410 may be irradiated to the substrate 500. In the embodiment, the substrate 500 may be at least one of various substrates 500. Accordingly, the laser beam L split into the sub-beams SL may be irradiated to a surface of the substrate 500.

A drive part or driver unit 420 may be disposed in direct contact with the light distribution part 410 and adjust the position of the light distribution part 410. The drive part 420 may adjust relative positions between the light distribution part 410 and the substrate 500 by adjusting the position of the light distribution unit 410. The drive part 420 may include multiple axes. The drive part 420 may have multiple movement axes. The drive part 420 may sequentially move along (or in) the movement axes and align the light distribution part 410. The drive part 420 may decrease or increase a distance between the light distribution part 410 and the substrate 500 by moving the light distribution unit 410 in the Z-axis direction in the drawing. The drive part 420 may rotate the light distribution part 410 clockwise and/or counterclockwise around the Z-axis that is an optical axis on the same XY plane in the drawing. Accordingly, angles of the light distribution part 410 and the substrate 500 with respect to the optical axis may be matched. Detailed description of the light distribution part 410 and the substrate 500 is provided below with reference to FIGS. 3 to 6. The moving direction of the light distribution part 410 by the drive part 420 is not limited thereto. For example, in case that the light distribution part 410 and the substrate 500 are disposed not to be parallel to each other, the drive part 420 also may rotate the light distribution part 410. Thus, the light distribution part 410 and the substrate 500 may be parallel to each other.

The substrate 500 may be a substrate of a flat panel display, and an area where the laser beam L is irradiated may be a backplane of the flat panel display. In an aligning operation of aligning a laser using the laser device according to this embodiment, the substrate 500 may be a substrate before processing. Accordingly, the substrate 500 may have a flat shape before various holes and the like are formed. Detailed description of the substrate 500 forming various holes using a laser in the processing process after the laser alignment process is provided below.

Periodic reference patterns 510 may be disposed on a surface of the substrate 500. The reference patterns 510 may be a set (or group) of patterns (or unit patterns) 511. Although it is shown that the reference patterns 510 include the patterns 511 having a rectangular shape in the drawing, the disclosure is not limited thereto. The pattern 511 may have various shapes other than the rectangular shape. For example, the patterns 511 included in the reference patterns 510 may have a rhombus shape or a pentagonal shape, and may also have a triangular shape in some embodiments. However, even though the patterns 511 have various shapes, the shape of the reference pattern 510 may have periodicity as a whole.

The reference pattern 510 may assist in determining whether to align the sub-beams SL irradiated to the substrate 500. For example, whether to align the sub-beams SL may be determined depending on whether an irradiation position of the sub-beam SL irradiated to the substrate 500 is the same as the relative position of the pattern 511 within each unit pattern 511. For example, in case that the irradiation position of the sub-beam SL is within the relative position of the pattern 511, the sub-beams SL may be determined to be aligned. Each of the patterns 511 may be processed in a drive part in the processing process (e.g., laser processing) after the laser alignment. For example, a pattern 511 may also be processed to form a pixel.

The sub-beams SL incident on the substrate 500 may form focuses on the surface of the substrate 500. Points (or points of the focuses) formed on the surface of the substrate 500 by the sub-beams SL may be defined as a pitch 900. The sub-beam SL forming the pitch 900 may be reflected from the substrate 500. Although it is shown that the sub-beam SL is reflected from the substrate 500 in the drawing, the disclosure is not limited thereto. In some embodiments, the sub-beam SL may also be transmitted through the substrate 500 without being reflected from the substrate 500. Detailed description of the sub-beam SL transmitted through the substrate 500 is provided below with reference to FIG. 16. For convenience of description, it is assumed that the sub-beam SL is reflected from the substrate 500.

The sensing part 600 may be disposed in a direction of the sub-beam SL reflected from the substrate 500. The sensing part 600 may detect the sub-beam SL reflected from the substrate 500. The sensing part 600 may include light detection parts. Each of the light detection parts may be a photodiode, but is not limited thereto. For example, the light detection part may also be a phototransistor or a photoresistor that is turned on when detecting the sub-beam SL. The sensing part 600 may have the light detection parts disposed in a matrix form.

The sensing part 600 may convert the sub-beam SL into an electrical signal in case that the sub-beam SL is incident on the sensing part 600. The sensing part 600 may transmit the corresponding signal to the control part 700 electrically connected to the sensing part 600.

Figure 2:
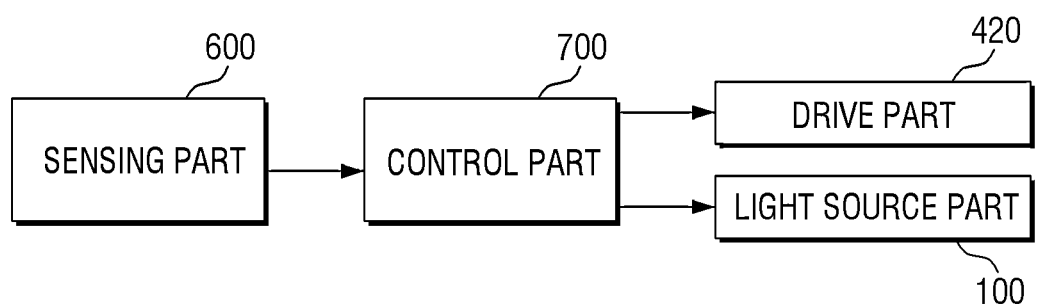
FIG. 2 is a schematic block diagram of the laser device.

FIG. 2 is a schematic block diagram of the laser device.

Referring to FIG. 2, the laser device may include the sensing part 600, the control part 700, the drive part 420, and the light source part 100.

The sensing part 600 may sense scattered light of each of all the incident sub-beams SL and convert the scattered light into an electrical signal. The sensing part 600 may transmit the electrical signal to the control part 700. The control part 700 may record the signal received from the sensing part 600. For example, the control part 700 may record electrical signals received from the sensing part 600 together with position information of the light distribution part 410. Accordingly, it is possible to store electrical signals for each position of the light distribution part 410.

The control part 700 may classify the received electrical signals into values of rows and columns. The control part 700 may aggregate electrical signals in a same row and display the aggregated electrical signals on a coordinate axis. A graph may be shown by aggregating the signals shown on the coordinate axis. In case that the graph of the row is shown (e.g., completely shown), a same operation may be performed on a next row. For example, the electrical signals of the next row may also be shown on a coordinate axis, a graph may be shown by aggregating the electrical signals, and the same operation may be performed on a next row. Accordingly, the control part 700 may generate as many graphs as the number of columns. Although the control part 700 independently generates the graph for each row, the disclosure is not limited thereto. For example, the control part 700 may overlap and display the electrical signals, which are generated by converting the scattered light of the sub-beam SL detected by the sensing part 600, on a plane corresponding to the plane of the sensing part 600, and also generate a graph by aggregating the electrical signals.

The control part 700 may convert the generated graphs into graph signals. The control part 700 may generate an image using a raster scan method based on the generated graph signals. For example, the control part 700 may image the graph signals in the same order as an order in which the laser beam L (or the sub-beam SL) moves and is irradiated to the substrate 500 due to the movement of the optical path adjustment part 200. The raster scan method may refer to a technique that generates or records image elements by line-by-line irradiation. Detailed description of the raster scan method is provided below with reference to FIG. 9.

The control part 700 may measure an image contrast of the generated image. For example, the control part 700 may measure a brightness difference value between a brightest point and a darkest point of the corresponding image. After the measuring of the image contrast value, the control part 700 may transmit a movement signal to the drive part 420. The drive part 420 may adjust the position of the light distribution part 410. In case that the position of the light distribution part 410 is adjusted, a same process may be repeated. The position of the light distribution part 410 may be adjusted on an axis (or unfixed axis) in a state in which all other axes of the drive part 420 are fixed. For example, remaining axes of the drive part 420 may be fixed, and the position of the light distribution part 410 may be adjusted on the unfixed axis. In case that all the image contrast values are measured with respect to a movement value of the axis (e.g., the unfixed axis), the process may move to another axis. For example, the another axis may be another unfixed axis, and remaining axes of the drive part 420 may be fixed. Even on the another axis (e.g., the another unfixed axis), positions of the axes other than the corresponding axis (e.g., the another unfixed axis) may be fixed in a same method, and an image contrast value may be measured by sequentially moving movement values of the corresponding axis (e.g., the another unfixed axis). By the above-described method, the control part 700 may measure the image contrast values for all positions of the light distribution part 410.

In case that the light distribution part 410 is aligned with the substrate 500, the sub-beam SL may be irradiated to a same domain inside the pattern 511 on the substrate 500. Accordingly, the sub-beams SL incident on insides of the patterns 511 may be transmitted through the substrate 500 and have a same measurement value, so that the signals detected by the sensing part 600 may overlap each other. In case that a graph is generated based on the signals detected by the sensing part 600 and an image is generated by the raster scan method, a difference between a portion (e.g., portion of the substrate 500) where the sub-beam SL is irradiated and a portion (e.g., portion of the substrate 500) where the sub-beam SL is not irradiated may be clear. Accordingly, the image contrast value may represent a relatively high value.

In another embodiments, in case that the light distribution part 410 is not aligned with the substrate 500, the sub-beam SL may be irradiated to various domains inside the pattern 511 on the substrate 500, so that since the relative positions between the pattern 511 and the sub-beam SL are different, the signals detected by the sensing part 600 may have different measurement values. In case that a graph is generated based on this and an image is generated by the raster scan method, a difference between a portion (e.g., portion of the substrate 500) where the sub-beam SL is irradiated and a portion (e.g., portion of the substrate 500) where the sub-beam SL is not irradiated may not be clear. Accordingly, the image contrast value may represent a relatively low value.

The control part 700 may record the contrast values according to all positions of the drive part 420 of the light distribution part 410 (or all positions of the light distribution part 410), and may show (or display) each of the contrast values as a graph according to each axis of the light distribution part 410. For example, in case that the drive part 420 of the light distribution part 410 moves the light distribution part 410 in three axes, the control part 700 may generate three graphs in which the movement value of each of the three axes has an X-axis value and the image contrast value has a Y-axis value. The control part 700 may determine a point having a maximum image contrast value on each axis of the light distribution part 410 as an alignment point of the light distribution part 410. For example, the point having the maximum image contrast value on each axis of the light distribution part 410 (or each axis of the drive part 420) may be the alignment point of the light distribution part 410. For example, a merit function may be an image contrast. Accordingly, the control part 700 may send a signal to the drive part 420. Thus, the drive part 420 of the light distribution part 410 may move the light distribution part 410 to the point having the maximum image contrast value on each axis, and the drive part 420 may move the light distribution part 410 to the corresponding position. Therefore, the alignment process of the light distribution part 410 may be performed.

After the alignment process is performed, the processing process (e.g., laser processing) may start. The control part 700 may send a signal to the light source part 100 to change the intensity of the laser beam L. The laser beam L used in the processing process may have a greater intensity than an intensity of the laser beam L used in the alignment process. The light source part 100 may generate the laser beam L to process (e.g., laser process) the substrate 500, and form a hole in the substrate 500.

Figure 3:
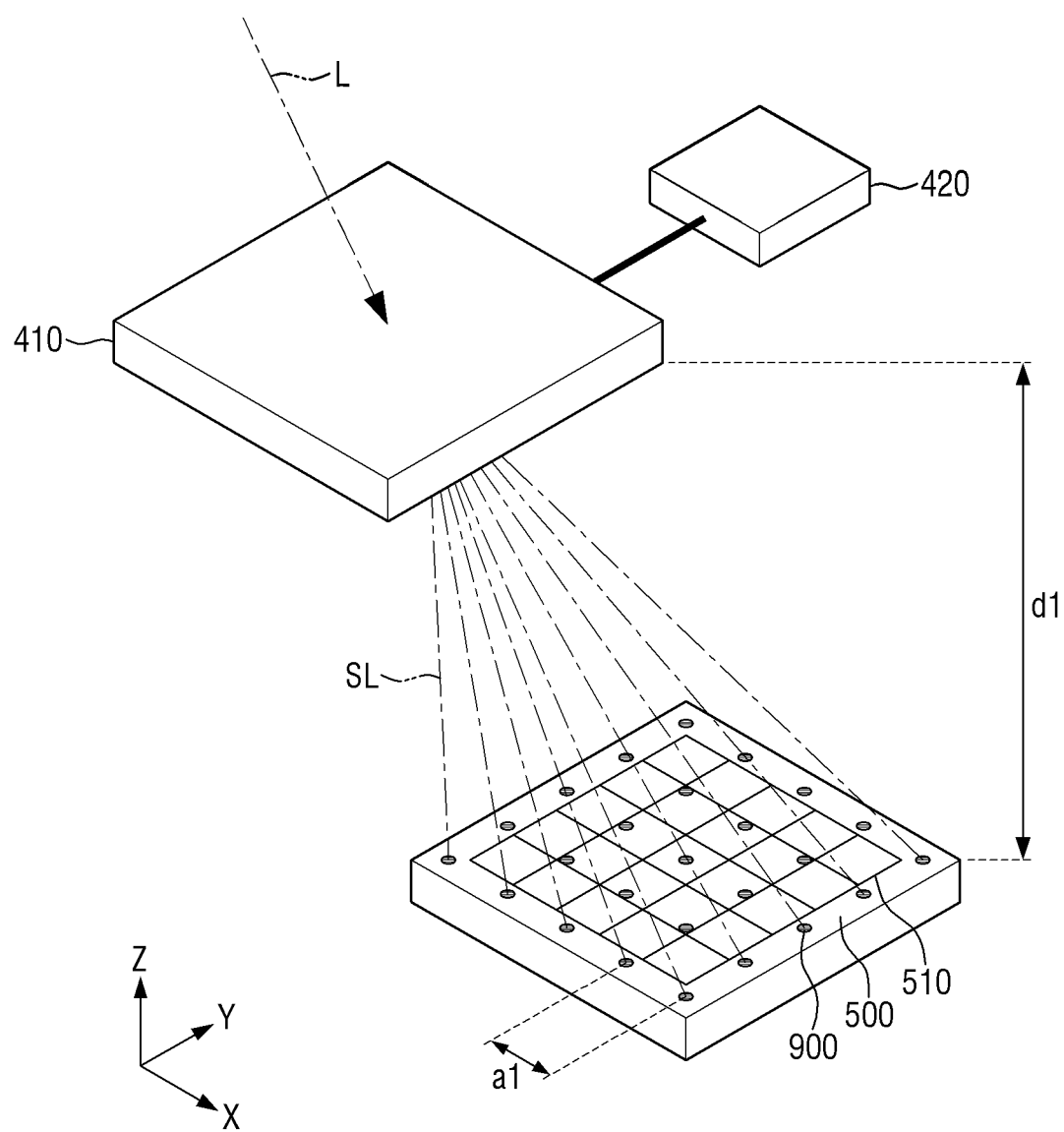
FIGS. 3 and 4 are schematic views showing the arrangement of sub-beams according to a distance between a light distribution part and a substrate.
Figure 4:
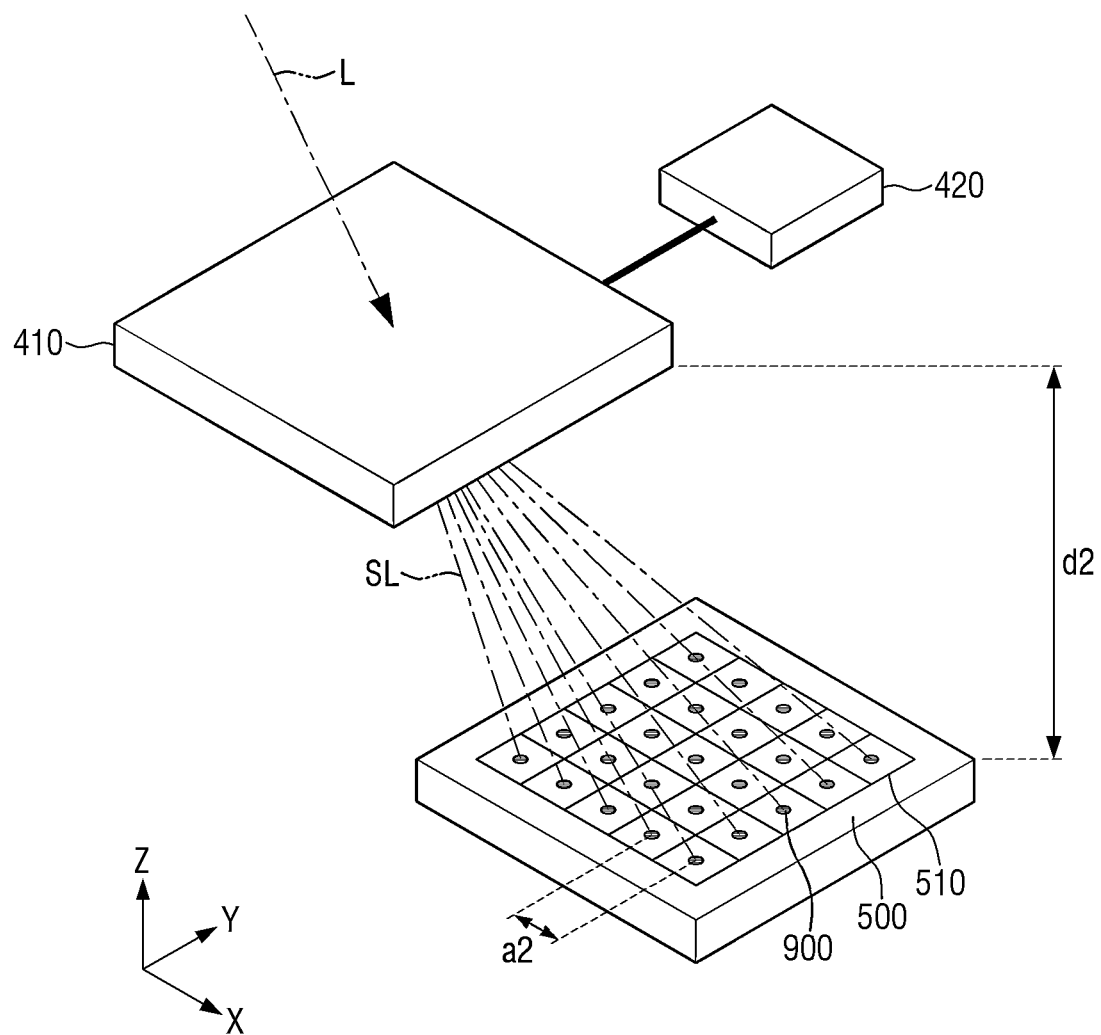

FIGS. 3 and 4 are schematic views showing the arrangement of the sub-beam SL according to a distance between the light distribution part 410 and the substrate 500.

Referring to FIG. 3, a single laser beam L may be incident on the light distribution part 410 and split (or divided) into sub-beams SL. Since the laser beam L incident on a point is split into the sub-beams SL having different paths and each sub-beam SL proceeds straight until reaching the substrate 500, a distance between the split sub-beams SL may increase as a distance from the light distribution part 410 increases.

In FIG. 3, it is assumed that the distance between the light distribution part 410 and the substrate 500 may be a distance d1. The sub-beam SL emitted from the light distribution part 410 may reach the surface of the substrate 500 on which the reference patterns 510 are disposed. Each sub-beam SL may form pitches 900 on the surface of the substrate 500, but a distance a1 between the respective pitches 900 (or between adjacent ones of the pitches 900) may be greater than a distance between center points of the patterns 511 (e.g., between center points of adjacent ones of the patterns 511) of the reference patterns 510. Thus, each pitch 900 may be formed on different domains within the pattern 511. Accordingly, the position of the light distribution part 410 may be adjusted. The drive part 420 may adjust the position of the light distribution part 410. For example, the drive part 420 may move by one space toward the substrate 500 along the Z-movement axis among the movement axes and move the light distribution part 410 toward the substrate 500 on the Z-axis.

Referring to FIG. 4, the distance between the light distribution part 410 and the substrate 500 may be less that that shown in FIG. 3. Accordingly, after the adjustment of the light distribution part 410, a distance d2, which is a distance between the light distribution part 410 and the substrate 500, may have a smaller value than the distance d1. Since only the point at which the light distribution part 410 has approached the substrate 500 in the Z-axis direction, has been changed, the sub-beam SL may proceed straight until reaching the substrate 500 as shown in FIG. 3. The distance between the light distribution part 410 and the substrate 500 may decrease, and the movement distance may decrease until the sub-beam SL reaches the substrate 500. Thus, the distance between the sub-beams SL irradiated to the substrate 500 may decrease. Accordingly, a distance a2, which is an interval between the pitches 900 (e.g., between adjacent ones of the pitches 900) on the substrate 500 after the adjustment, may be smaller than the distance a1, which is the interval between the pitches 900 (e.g., between adjacent ones of the pitches 900) on the substrate 500 before the adjustment. The distance a2 may be equal to the distance between the center points of the patterns 511 (e.g., between the center points of adjacent ones of the patterns 511). Accordingly, each pitch 900 may be formed on the same domain in the pattern 511.

In case that the drive part 420 moves by one space along the Z-movement axis, the distance between the pitches 900 may be changed by about 60 to about 80 nm. For example, in case that the drive part 420 moves the light distribution part 410 along the Z-movement axis to be closer to the substrate 500, the distance between the pitches 900 (e.g., between adjacent ones of the pitches 900) may be decreased by about 70 nm. Accordingly, the distance a2 in FIG. 4 may be smaller than the distance a1 in FIG. 3 by about 70 nm. As described above, since the distance between the pitches 900 may be adjusted (e.g., finely adjusted) by the movement of the drive part 420, the laser device according to an embodiment may adjust the arrangements of the pitches 900 within an error range of about 100 nm or smaller. As described above, the laser device according to the embodiment may improve a tolerance on the alignment of the sub-beams SL and the reference patterns 510.

Figure 5:
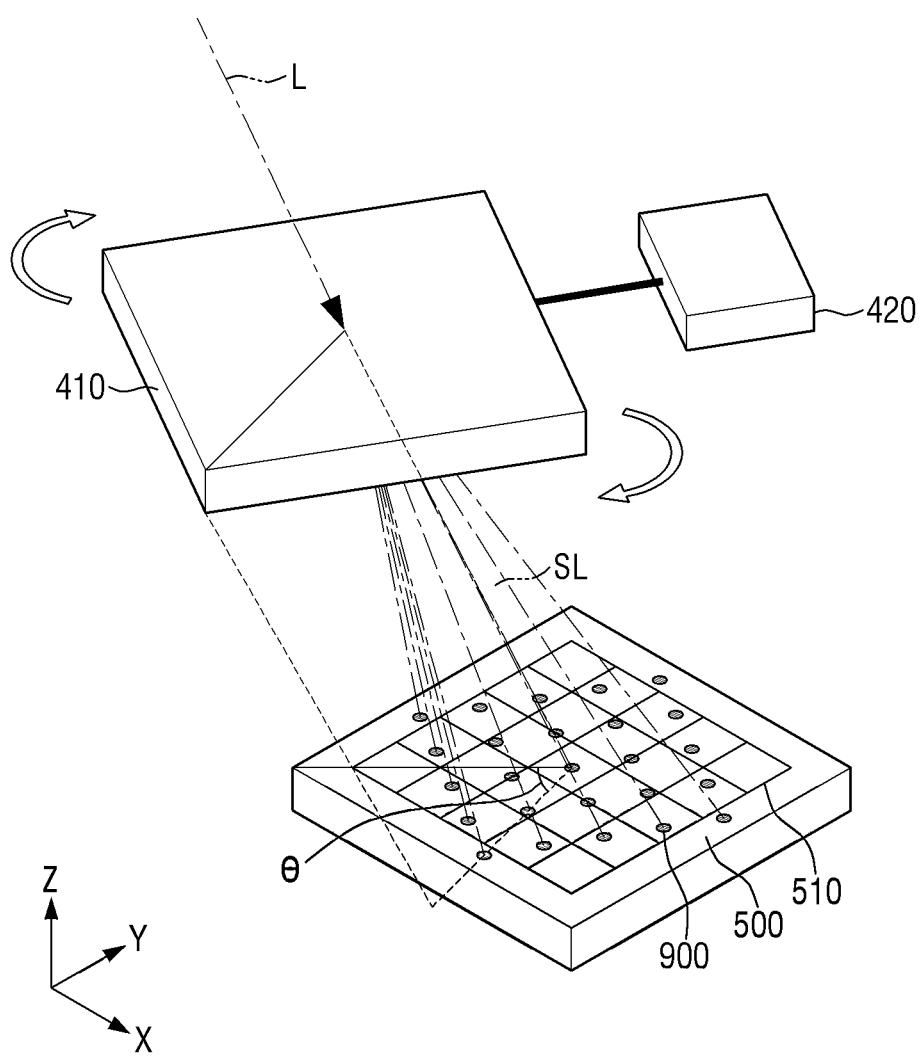
FIGS. 5 and 6 are schematic views showing the arrangement of the sub-beams according to an angle between the light distribution part and the substrate disposed in parallel.
Figure 6:
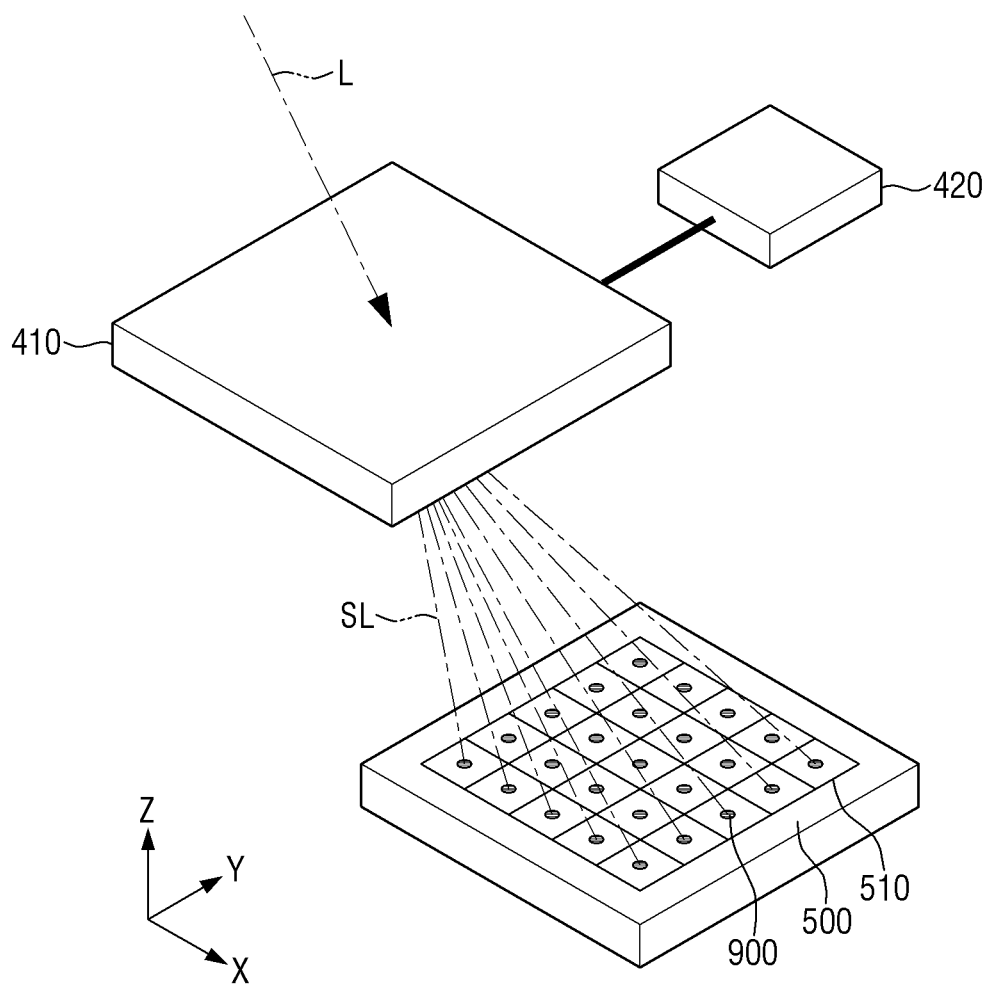

FIGS. 5 and 6 are schematic views showing the arrangements of the sub-beams SL according to an angle between the light distribution part 410 and the substrate 500 disposed in parallel.

Referring to FIG. 5, a single laser beam L may be incident on the light distribution part 410 and split (or divided) into multiple sub-beams SL. A direction in which the laser beam L incident on the light distribution part 410 is split and emitted, and the number of split beams may depend on a value that is set for each light distribution part 410. As shown in the drawing, the laser beam L vertically incident on an upper surface of the light distribution part 410 may be split into the 5×5 sub-beams SL having rows parallel to an edge of the light distribution part 410 and having columns parallel to another edge of the light distribution part 410 and the split sub-beams SL may be emitted. However, the disclosure is not limited thereto. For example, the laser beam L incident on the light distribution part 410 may be emitted in various directions and/or as various number of sub-beams SL according to the light distribution part 410. Hereinafter, for convenience of explanation, the light distribution part 410 may emit the sub-beams SL in a same direction and number as in the drawing.

The sub-beam SL emitted from the light distribution part 410 may reach the surface of the substrate 500 on which the reference patterns 510 are disposed. Each sub-beam SL may form the pitch 900 on the surface of the substrate 500, but the alignment direction of each pitch 900 and the periodic direction of the pattern 511 (e.g., refer to FIG. 1) on the substrate 500 may be different. Accordingly, each pitch 900 may be formed on different domains in the pattern 511. For example, it is possible to extend the path of the laser beam L incident on the upper surface of the light distribution part 410. A line connecting a point where the corresponding path comes into contact with the upper surface of the light distribution part 410 with one edge of the light distribution part 410 and a line connecting a point where an extension path of the laser beam L comes into contact with an upper surface of the substrate 500 with one edge of the substrate 500 are defined as a reference line of the light distribution part 410 and a reference line of the substrate 500, respectively. The reference line of the light distribution part 410 and the reference line of the substrate 500 may not overlap in the Z-axis direction. Accordingly, since an angle θ between the two reference lines may be different from zero, the position of the light distribution part 410 may be adjusted. The drive part 420 may adjust the position of the light distribution part 410. For example, the drive part 420 may move along an angular movement axis among the movement axes and rotate the light distribution part 410 clockwise or counterclockwise on the XY plane.

Referring to FIG. 6, the drive part 420 may rotate the light distribution part 410 in a clockwise direction. Accordingly, the reference line of the light distribution part 410 and the reference line of the substrate 500 may overlap in the Z-axis direction. Accordingly, the angle θ between the two reference lines may be zero. Accordingly, the pitch 900 formed by each sub-beam SL may be disposed on the same domain in the pattern 511.

As shown in FIGS. 4 and 6, in case that each sub-beam SL is focused on the same domain in the pattern 511, as described above, the image contrast value may represent a high value. For example, the image contrast value in FIG. 4 may be greater than that in FIG. 3 and the image contrast value in FIG. 6 may be greater than that in FIG. 5. Accordingly, adjusting the arrangement in FIG. 3 to the arrangement in FIG. 4 and adjusting the arrangement in FIG. 4 to the arrangement in FIG. 6 may be performed at once by adjusting the light distribution unit 410 to the position having the maximum image contrast value.

Although the drive part 420 moves the light distribution part 410 in the Z-axis direction and rotates the light distribution part 410 on the XY plane in relation to the direction in which the drive part 420 moves the light distribution part 410, the direction in which the drive part 420 moves the light distribution part 410 is not limited thereto. For example, in case that the light distribution part 410 and the substrate 500 are disposed not to be parallel to each other, the drive part 420 may also adjust the light distribution part 410 to be parallel to the substrate 500.

Figure 7:
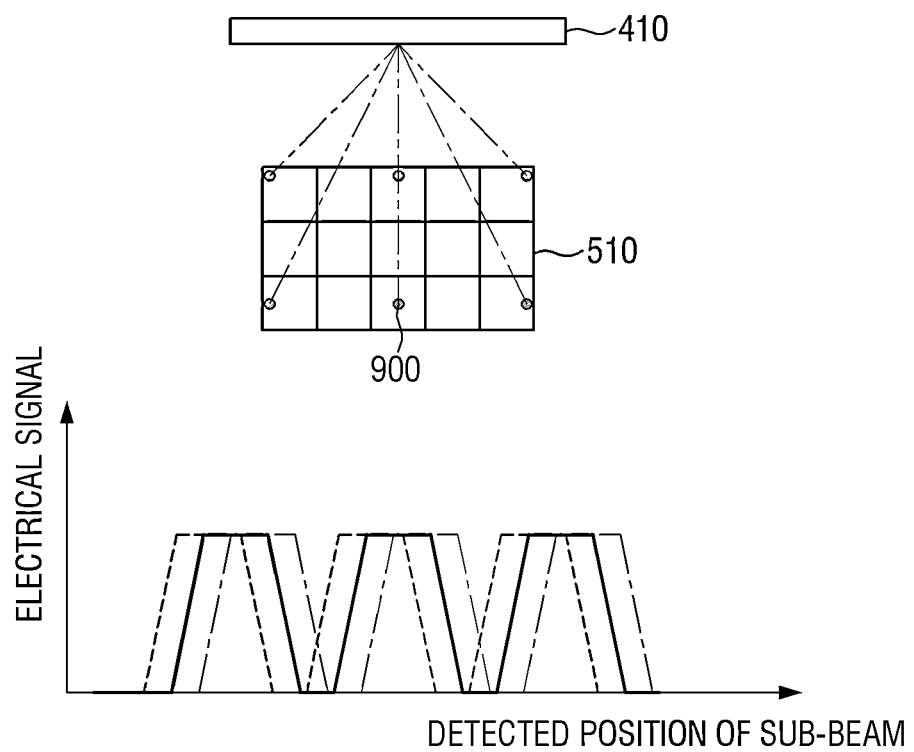
FIG. 7 is a schematic view showing a detection signal of a sensing part in case that the light distribution part is not aligned.
Figure 8:
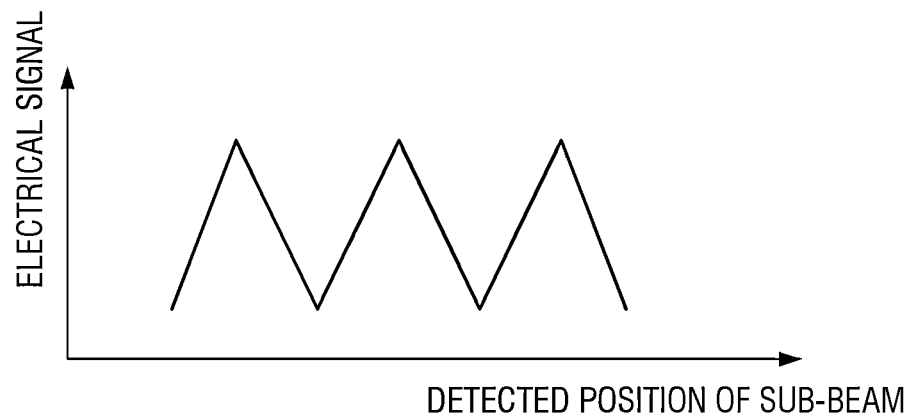
FIG. 8 is a graph schematically showing the aggregated detection signal(s) in FIG. 7.
Figure 9:
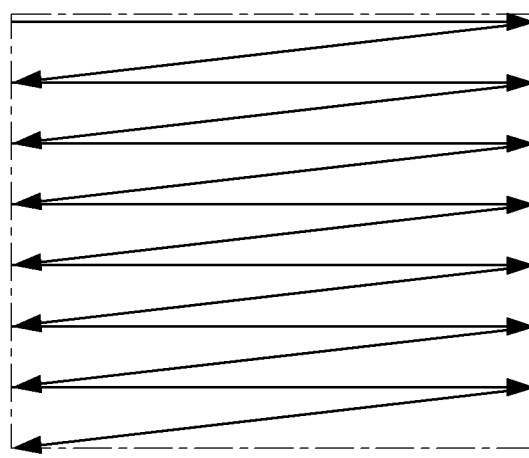
FIG. 9 is a schematic view showing a raster scan method.
Figure 10:
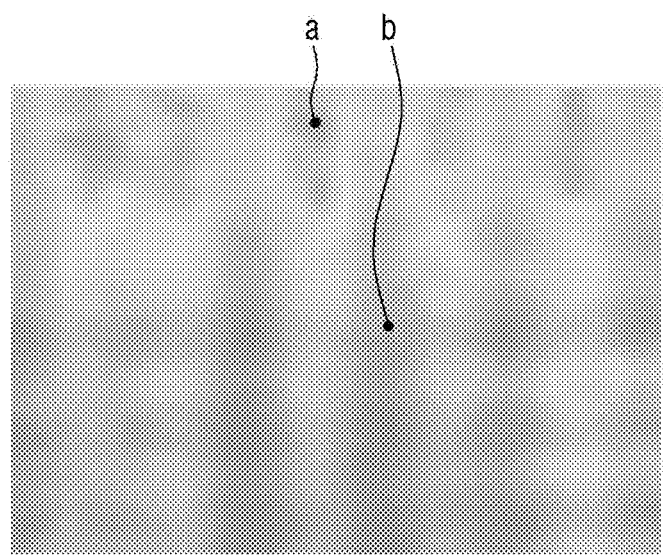
FIG. 10 schematically shows an image obtained by imaging the signal in FIG. 8 using the raster scan method.

FIG. 7 is a schematic view showing a detection signal of the sensing part 600 in case that the light distribution part 410 is not aligned. FIG. 8 is a graph schematically showing the aggregated detection signals in FIG. 7. FIG. 9 is a schematic view showing a raster scan method. FIG. 10 shows an image obtained by schematically imaging the signal in FIG. 8 using the raster scan method.

Referring to FIG. 7, the sensing part 600 (e.g., refer to FIG. 1) may sense scattered light of all incident sub-beams SL and convert the scattered light into an electrical signal. The sensing part 600 may transmit the electrical signal to the control part 700. The control part 700 may record the electrical signal received from the sensing part 600. For example, the control part 700 may record the electrical signal received from the sensing part 600 together with position information of the light distribution part 410.

The control part 700 may classify the received electrical signal into values of rows and columns. The control part 700 may aggregate electrical signals belonging to a same row and display the aggregated electrical signals on a coordinate axis. A single graph may be shown by aggregating the electrical signals shown on the coordinate axis. Although it is described that the control part 700 independently generates the graph for each row, the disclosure is not limited thereto. For example, the control part 700 may overlap and display the electrical signals, which are generated by converting the scattered light of the sub-beam SL detected by the sensing part 600, on a plane corresponding to the plane of the sensing part 600, and also generate a graph by aggregating the electrical signals.

The sub-beam SL emitted from the light distribution part 410 may reach the surface of the substrate 500 on which the reference patterns 510 are disposed and may be transmitted through or may be diffracted from the substrate 500 to reach the sensing part 600.

In case that the light distribution part 410 is not aligned, the sub-beam SL may not be aligned with the reference pattern 510 on the substrate 500 as described above. Thus, a focus may be formed in different domains in each pattern 511. For example, an area where the pitches 900 are formed may be a different area inside each pattern 511 (or inside of another pattern 511). For example, in the drawing, the pitch 900 disposed at a left of the pattern 511 may be tilted to the left inside the pattern 511 (or inside of another pattern 511 disposed at the left), the pitch 900 disposed at a center may be disposed at a central portion inside the pattern 511, and the pitch 900 disposed at a right may be tilted to the right inside the pattern 511 (or inside of still another pattern 511 disposed at the right). Accordingly, the sub-beams SL that are transmitted through or are diffracted from the substrate 500 to reach the sensing part 600 may generate different signals.

Referring to FIGS. 7 and 8, it is shown in the drawing that a signal by the sub-beam SL incident on the left of the upper surface of the substrate 500 is indicated by a dotted line, a signal by the sub-beam SL incident on the center thereof is indicated by a solid line, and a signal by the sub-beam SL incident on the right thereof is indicated by a dashed-dotted line. As shown in the drawings, the dotted line, the solid line, and the dashed-dotted line may represent different signals. Accordingly, in case that the signals of the dotted line, the solid line, and the dashed-dotted line are aggregately shown, all of the signals of the dotted line, the solid line, and the dashed-dotted line may have signal values greater than or equal to a level (e.g., a certain or selectable level) in the area where the signal is detected. Thus, the distinction between a point to which the signal is applied and a point to which the signal is not applied may not be clear.

Referring to FIG. 9, the control part 700 may convert the generated graphs into graph signals. The control part 700 may generate an image using the raster scan method based on the generated graph signals. For example, the control part 700 may image the graph signal in a same order as an order in which the laser beam L (or sub-beam SL) moves and is irradiated on the substrate 500 due to the movement of the optical path adjustment part 200. The raster scan may refer to a technique that generates or records image elements by line-by-line irradiation. For example, as shown in FIG. 9, the control part 700 may divide the image generation area into rows and columns, and may convert the graph signal into the image by repeating a process of generating an image for a row, moving to a next row to generate an image, and moving to a next row to generate an image.

Referring to FIG. 10, the control part 700 may measure an image contrast of the generated image. For example, the control part 700 may measure a brightness difference value between the brightest point and the darkest point of the corresponding image. For example, the control part 700 may determine point 'a' as the brightest point, and point 'b' as the darkest point on the image. The control part 700 may measure each of the brightness of the point 'a' and the brightness of the point 'b' and measure a brightness difference value therebetween.

In case that the light distribution part 410 is not aligned with the substrate 500, the signals of each sub-beam SL may be variously detected, and thus in the image, a difference in brightness between a portion brightly displayed and a portion not brightly displayed by detecting a signal of the sub-beam SL may be insignificant. In other words, the difference in brightness between the point 'a' and the point 'b' may be insignificant. Accordingly, the image contrast value may have a small value.

Figure 11:
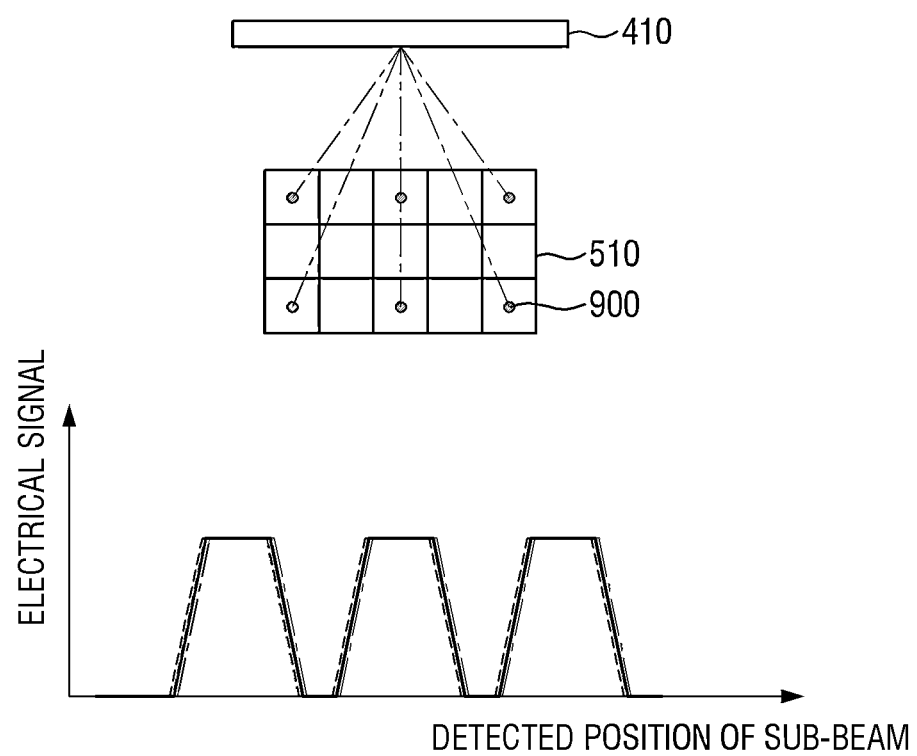
FIG. 11 is a schematic view showing a detection signal of the sensing part in case that the light distribution part is aligned.
Figure 12:
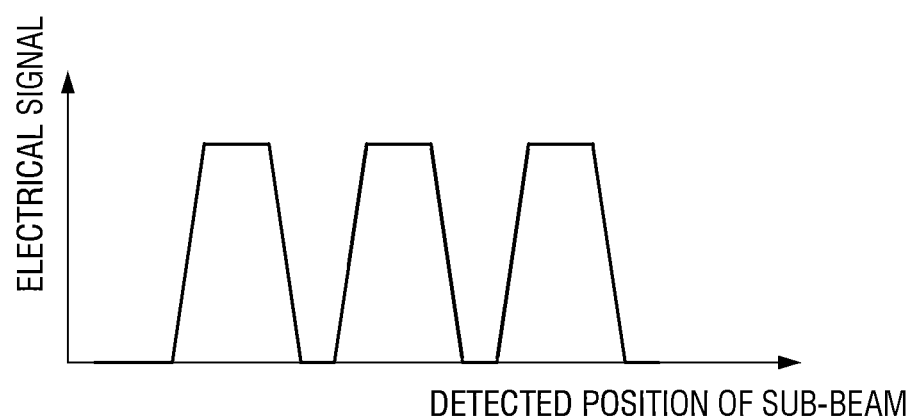
FIG. 12 is a graph schematically showing the aggregated detection signal(s) in FIG. 11.
Figure 13:
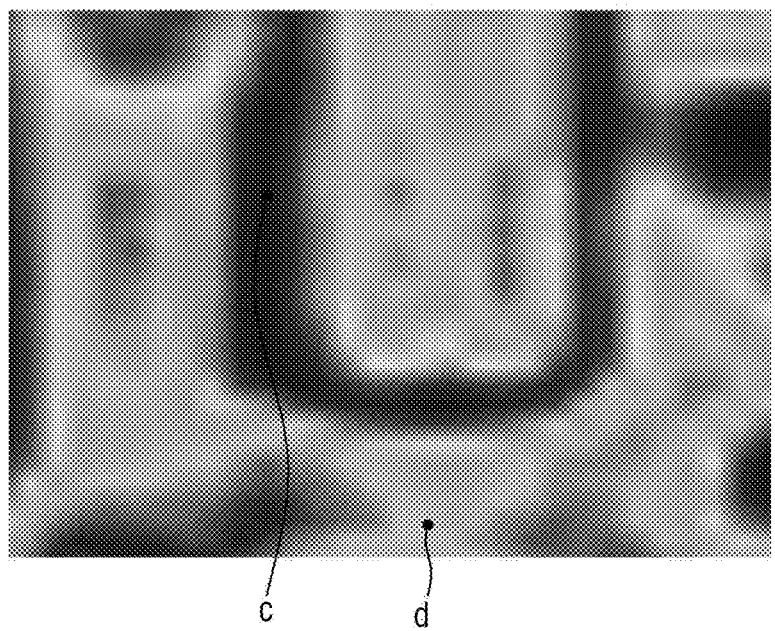
FIG. 13 schematically shows an image obtained by imaging the signal in FIG. 12 using the raster scan method.

FIG. 11 is a schematic view showing a detection signal of the sensing part 600 in case that the light distribution part 410 is aligned. FIG. 12 is a graph schematically showing the aggregated detection signals in FIG. 11. FIG. 13 shows an image obtained by schematically imaging the signal in FIG. 12 using the raster scan method.

Referring to FIG. 11, the sensing part 600 (e.g., refer to FIG. 1) may sense scattered light of all incident sub-beams SL and convert the scattered light into an electrical signal. The sensing part 600 may transmit the electrical signal to the control part 700. The control part 700 may record the electrical signal received from the sensing part 600. For example, the control part 700 may record the electrical signal received from the sensing part 600 together with position information of the light distribution part 410.

The control part 700 may classify the received electrical signal into values of rows and columns. The control part 700 may aggregate electrical signals in a same row and display the aggregated electrical signals on a coordinate axis. A single graph may be shown by aggregating the electrical signals shown on the coordinate axis. Although it is described that the control part 700 may independently generate the graph for each row, the disclosure is not limited thereto. For example, the control part 700 may overlap and display the electrical signals, which are generated by converting the scattered light of the sub-beam SL detected by the sensing part 600, on a plane corresponding to the plane of the sensing part 600, and also may generate a graph by aggregating the electrical signals.

The sub-beam SL emitted from the light distribution part 410 may reach the surface of the substrate 500 on which the reference patterns 510 are disposed and may be reflected from the substrate 500 to reach the sensing part 600.

In case that the light distribution part 410 is aligned with the substrate 500, as described above, the sub-beam SL may be aligned with the reference pattern 510 on the substrate 500. Thus, a focus may be formed in the same domain in each pattern 511. For example, the area where the pitches 900 are formed may be the same area inside each pattern 511. For example, each of the pitches 900 shown in the drawing may be disposed at a center point of the pattern 511 including the corresponding focus. Accordingly, the sub-beams SL that are transmitted through or are diffracted from the substrate 500 to reach the sensing part 600 may generate a same signal.

Referring to FIGS. 11 and 12, a signal by the sub-beam SL incident on a left of the upper surface of the substrate 500 may be indicated by a dotted line, a signal by the sub-beam SL incident on a center thereof is indicated by a solid line, and a signal by the sub-beam SL incident on a right thereof is indicated by a dashed-dotted line. As shown in the drawings, the dotted line, the solid line, and the dashed-dotted line may represent the same signal. Accordingly, in case that the signals of the dotted line, the solid line, and the dashed-dotted line are aggregately shown, each signal may have an amplified signal value. Thus, the distinction between a point to which the signal is applied and a point to which the signal is not applied may be made clearer. For example, the point to which the signal is applied may be distinguished by the point to which the signal is not applied.

Referring to FIG. 13, the control part 700 may convert the generated graphs into graph signals. The control part 700 may generate an image using the raster scan method based on the generated graph signals. For example, the control part 700 may image the graph signal in a same order as an order in which the laser beam L (or sub-beams SL) moves and is irradiated on the substrate 500 due to the movement of the optical path adjustment part 200. The control part 700 may measure an image contrast of the generated image. For example, the control part 700 may measure a brightness difference value between a brightest point (e.g., a point 'c' of FIG. 13) and a darkest point (e.g., a point 'd' of FIG. 13) of the corresponding image. For example, the control part 700 may determine the point 'c' as the brightest point and the point 'd' as the darkest point on the image. The control part 700 may measure each of the brightness of the point 'c' and the brightness of the point 'd' to measure a brightness difference value therebetween.

In case that the light distribution part 410 is aligned with the substrate 500, the signals of the sub-beams SL maximally overlaps, and the electrical signals may be clearly distinguished. Thus, in the image, the difference in brightness between the portion brightly displayed and the portion not brightly displayed in the image by detecting the signal of the sub-beam SL may have the maximum value. For example, the difference in the brightness between the point 'c' and the point 'd' may have the maximum value. Accordingly, the image contrast value may have a maximum value.

Figure 14:
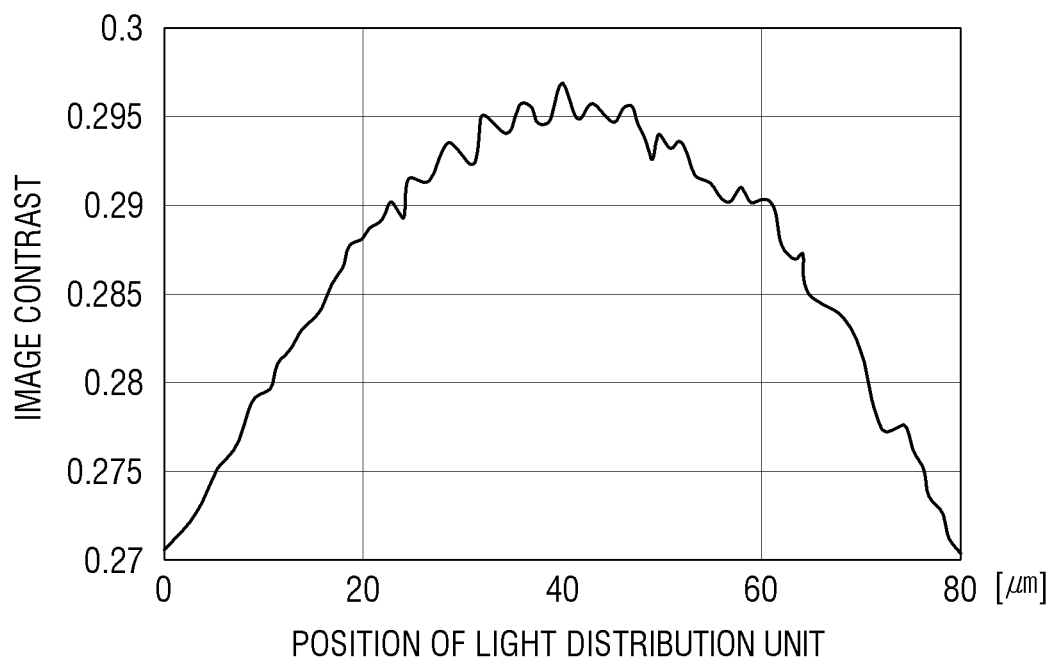
FIG. 14 is a schematic image contrast graph according to the arrangement of a drive part.

FIG. 14 is a schematic image contrast graph according to the arrangement of the drive part 420.

Referring to FIG. 14, the control part 700 may measure an image contrast and record the measured image contrast together with the position of the light distribution part 410. The drive part 420 configured to adjust the position of the light distribution part 410 may have movement axes such as a distance axis that adjusts the distance between the light distribution part 410 and the substrate 500, an angular axis that adjusts the angle between the light distribution part 410 and the substrate 500, and the like. The control part 700 may set (or determine) one of the movement axes of the drive part 420 and sequentially move the drive part 420 along the corresponding axis (e.g., set or determined corresponding axis) in a state in which other movement axes are fixed, and measure the image contrast value and record the image contrast value together with the position of the light distribution part 410. For example, remaining axes of the drive part 420 may be fixed, and the position of the light distribution part 410 may be adjusted on the unfixed axis (or the corresponding axis). Thus, the control part 700 may measure the image contrast value and record the image contrast value together with the position of the light distribution part 410 for the unfixed axis (or the corresponding axis). One of the fixed axes of the drive part 420 may be unfixed, remaining axes of the drive part 420 may be fixed, and the position of the light distribution part 410 may be adjusted on the unfixed axis (or another unfixed axis). Thus, the control part 700 may measure the image contrast value and record the image contrast value together with the position of the light distribution part 410 for the unfixed axis (or the another unfixed axis). The above-described process may be repeated for all of the axes of the drive part 420. The control part 700 may generate a graph in which the X-axis value represents the position of the light distribution part 410 and the Y-axis value represents the image contrast value based on the corresponding record. The position of the light distribution part 410 may be a distance at which the light distribution part 410 is spaced apart from the reference position. Referring to the graph, the image generated by the control part 700 may have different image contrasts according to the position of the light distribution part 410. The control part 700 may determine the position (or point) of the drive part 420 having the maximum image contrast value on the graph, and determine the corresponding point as the alignment point of the drive part 420 and the light distribution part 410 of the corresponding axis (e.g., set or determined corresponding axis). For example, a merit function may be an image contrast. For example, a position of about 40 which is a point indicating the maximum image contrast value in the drawing, may be determined as the alignment point of the drive part 420.

Figure 15:
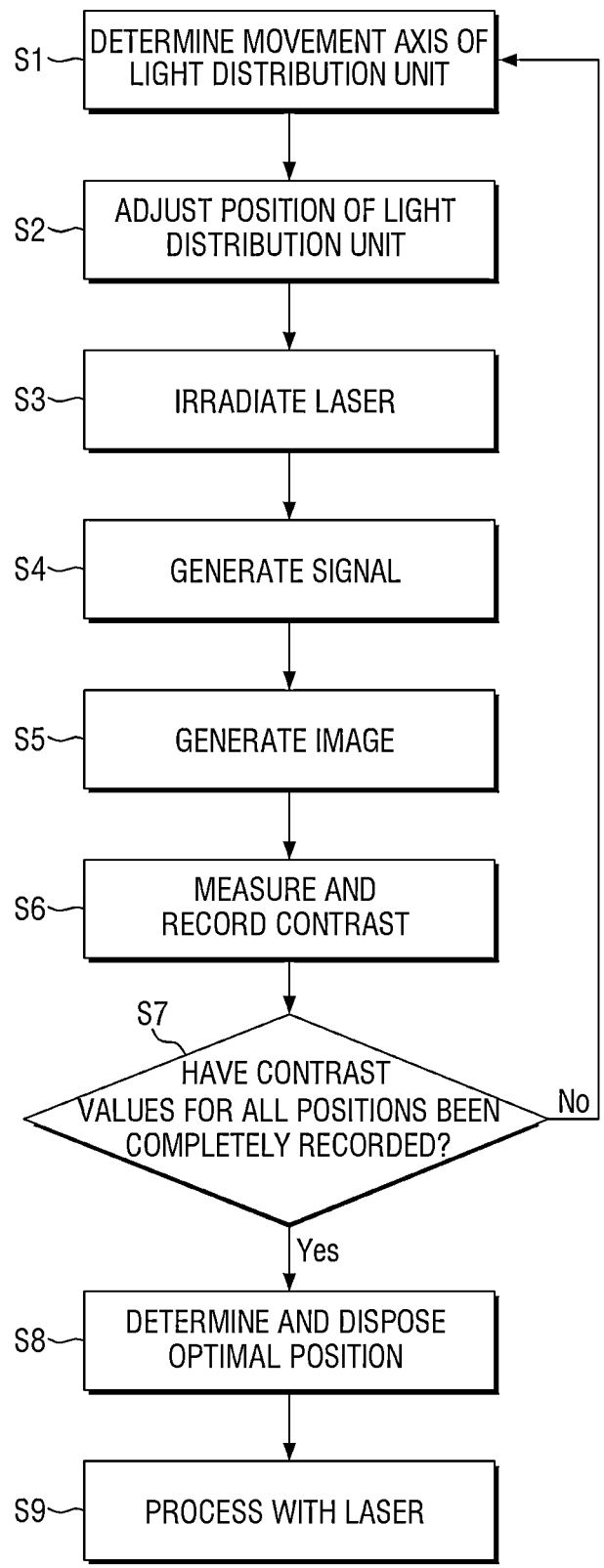
FIG. 15 is a flowchart schematically illustrating a method of aligning the laser device.

FIG. 15 is a flowchart schematically illustrating a method of aligning the laser device.

Referring to FIGS. 1 and 15, the method of aligning the laser device may include operations of determining the movement axis of the light distribution part 410 (S1), adjusting the position of the light distribution part 410 (S2), irradiating a laser (S3), generating a signal (S4), generating an image (S5), measuring and recording an image contrast (S6), determining whether contrast values for all positions have been recorded (e.g., completely recorded) (S7), determining an optimal position and disposing the drive part 420 at the optimal position (S8), and processing the substrate 500 with the laser (S9).

The operation of determining the movement axis of the light distribution part 410 (S1) may be an operation of fixing other axes (or remaining axes) among the movement axes of the drive part 420 included in the light distribution part 410 and determining the movement axis to sequentially move the drive part 420 (or the light distribution part 410) along an unfixed axis (e.g., a specific or selectable axis). For example, the remaining axes of the drive part 420 may be fixed, and the position of the light distribution part 410 may be adjusted on the unfixed axis. The fixing of the remaining axes of the drive part 420 and the adjusting of the light distribution part 410 on the unfixed axis may be repeatedly performed to determine the movement axis. For example, the movement axis for adjusting the distance between the light distribution part 410 and the substrate 500 among the movement axes may be determined first.

The operation of adjusting the position of the light distribution part 410 (S2) may be an operation of adjusting the position of the drive part 420 along the determined movement axis. The position of the drive part 420 may be adjusted, and the light distribution part 410 and the drive part 420 may move along the movement axis.

The operation of irradiating the laser (S3) may be an operation of irradiating the laser beam L from the light source part 100 toward the optical path adjustment part 200. The irradiated laser (or the irradiated laser beam L) may be incident on the light distribution part 410 through the optical path adjustment part 200 and the f-theta lens 300. The laser beam L incident on the light distribution part 410 may be split into sub-beams SL and incident on the substrate 500.

The sub-beam SL incident on the substrate 500 may be transmitted through the substrate 500 and may be incident on the sensing part 600.

The operation of generating the signal (S4) may be an operation of detecting the sub-beam SL and converting the detected sub-beam SL into an electrical signal by the sensing part 600. The sensing part 600 may detect the sub-beams SL transmitted through the substrate 500 and incident on the sensing part 600, and convert the detected sub-beams SL together with each detected position into an electrical signal. The control part 700 may generate a graph by aggregating the detection signals of the sub-beams SL. A process in which the sensing part 600 detects the sub-beam SL and converts the detected sub-beam SL into the electrical signal and the control part 700 aggregates the electrical signals may be synchronized with a position adjustment part (e.g., the optical path adjustment part 200). For example, the detecting of the sub-beam SL by the sensing part 600 to convert the detected sub-beam SL into the electrical signal and the aggregating of the electrical signals by the control part 700 may be synchronized with the optical path adjustment part 200.

The operation of generating the image (S5) may be an operation of generating an image based on the electrical signal by the control part 700. The control part 700 may use the raster scan method as the method of generating the image.

The operation of measuring and recording the image contrast (S6) may be an operation of measuring the difference in brightness between the brightest point and the darkest point in the image by analyzing the image generated by the control part 700 and recording the difference in brightness.

The operation of determining whether the contrast values for all positions have been recorded (e.g., completely recorded) (S7) may be an operation of determining whether the image contrasts for all individual positions of all the movement axes of the drive part 420 have been measured and recorded. In case that the image contrasts for all positions are not measured and recorded, the process may return to the operation of determining the movement axis of the light distribution part 410 (S1) again. In case that the image contrasts for all positions are measured and recorded, the process may move to the operation of determining the optimal position and disposing the drive part 420 at the optimal position (S8).

The operation of determining the optimal position and disposing the drive part 420 at the optimal position (S8) may include operations of forming graphs having the same number as the number of movement axes of the drive part 420 with respect to the image contrast values for each position of the light distribution part 410 recorded by the control part 700, determining positions of the light distribution part 410 and the drive part 420, which have the maximum image contrast value in each graph, and disposing the light distribution part 410 at the optimal position by moving the drive part 420 to the position of the drive part 420 having the maximum image contrast value. For example, in case that the drive part 420 includes the Z-movement axis for adjusting the distance between the light distribution part 410 and the substrate 500 and the angular movement axis for adjusting the angle between the light distribution part 410 and the substrate 500 disposed in parallel, it is possible to obtain a graph in which the positions of each of the drive part 420 and the light distribution part 410 according to the Z-movement axis is represented as the X-axis value and the image contrast value is represented as the Y-axis value, and a graph, in which the positions of each of the drive part 420 and the light distribution part 410 according to the angular movement axis are represented as the X-axis value and the image contrast value is represented as the Y-axis value. In each graph, a position within the Z-movement axis and a position within the angular movement axis, which have the maximum image contrast value, may be determined as optimal positions of the drive part 420 and the light distribution part 410. By moving the drive part 420 to the optimal position, the light distribution unit 410 may be disposed at the optimal position. By disposing the light distribution part 410 at the optimal position, the laser aligning operation may be completed. After the laser aligning operation is completed, the operation of processing the substrate 500 with the laser (S9) may be performed.

The operation of processing the substrate 500 with the laser (S9) may be an operation of increasing an intensity of the laser beam L emitted from the light source part 100 and emitting the laser beam L, and processing the substrate 500 through the optical path adjustment part 200, the f-theta lens 300, and the light distribution part 410 by irradiating the corresponding laser beam L. For example, the operation of processing the substrate 500 with the laser (S9) may be an operation of simultaneously forming organic film contact holes by irradiating the laser beam L split by the light distribution part 410 to an organic film, simultaneously forming inorganic film contact holes by irradiating the laser beam L to an inorganic film, or the like, but is not limited thereto.

Figure 16:
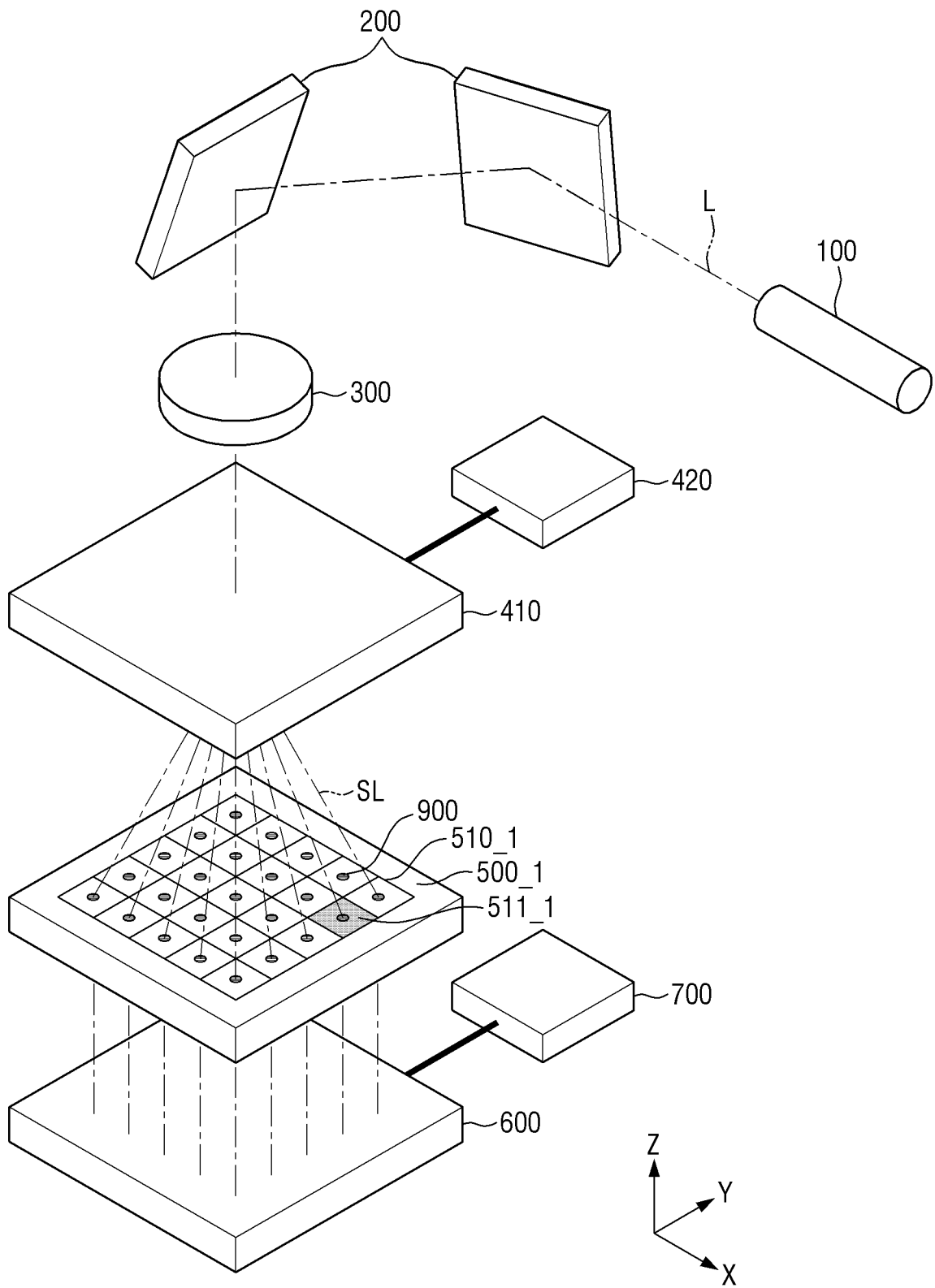
FIG. 16 is a schematic perspective view of a laser device according to another embodiment.

FIG. 16 is a schematic perspective view of a laser device according to another embodiment.

The laser device according to this embodiment is different from the embodiment of FIG. 1 at least in that a sensing part 600 detects the laser beam L transmitted through a substrate 500-1.

Referring to FIG. 16, the laser device according to this embodiment may include a light source part 100, an optical path adjustment part 200, an f-theta lens 300, a light distribution part 410, the sensing part 600, and a control part 700.

The optical path adjustment part 200 may be disposed in a direction of a laser emission portion of the light source part 100. The f-theta lens 300 may be disposed in a direction of an emission portion of the optical path adjustment part 200. The light distribution part 410 may be disposed in a direction of an emission portion of the f-theta lens 300. The substrate 500_1 may be disposed in a direction of an emission portion of the light distribution part 410. The sensing part 600 may be disposed in a path of the laser beam L (or sub-beams SL) transmitted through the substrate 500_1.

The sub-beam SL incident on a surface of the substrate 500_1 may form a pitch 900 on a surface of the substrate 500_1 and may be transmitted through the surface of the substrate 500_1. The substrate 500_1 may include a light-transmitting material for allowing the sub-beam SL to be transmitted through the substrate 500_1, but is not limited thereto.

The sensing part 600 may be disposed on a path in which the sub-beam SL is transmitted through the substrate 500_1 and progresses. The sensing part 600 may detect the sub-beam SL transmitted through the substrate 500_1. The sensing part 600 may include light detection parts. Each of the light detection parts may be a photodiode, but is not limited thereto. For example, the light detection part may also be a phototransistor or a photoresistor that is turned on when detecting the sub-beam SL. The sensing part 600 may have the light detection parts disposed in a matrix form.

In case that the sub-beam SL is incident on the sensing part 600, the sensing part 600 may convert the sub-beam SL into an electrical signal. The sensing part 600 may transmit the corresponding electrical signal to the control part 700 electrically connected to the sensing part 600.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A laser device, comprising:
   a light source part that emits a laser beam;
   an optical path adjustment part that reflects the laser beam emitted from the light source part and adjusts an irradiation direction of the laser beam;
   a light distribution part that splits the laser beam reflected from the optical path adjustment part into a plurality of sub-beams and irradiates the plurality of sub-beams to a substrate;
   a drive part that moves the light distribution part and adjusts relative positions between the light distribution part and the substrate;
   a sensing part that senses the plurality of sub-beams emitted from the substrate; and
   a control part that adjusts an arrangement of the optical path adjustment part and moves the drive part to adjust an arrangement of the light distribution part, wherein
   the control part generates an image based on a signal sensed by the sensing part and measures an image contrast of the image,
   the control part records and compares a plurality of image contrasts according to the position of the light distribution part to determine an optimal position of the light distribution part,
   the light source part emits a first laser beam and aligns the light distribution part, and
   the light source part emits a second laser beam having a greater intensity than an intensity of the first laser beam for laser processing the substrate.

2. The laser device of claim 1, wherein
   the drive part moves the light distribution part in a first movement axis and a second movement axis,
   the control part performs a process of:
   generating the image at a first point on the first movement axis of the light distribution part and measuring the image contrast;
   generating the image at a second point on the first movement axis and measuring the image contrast;
   generating the image at a third point on the first movement axis and measuring the image contrast on all points on the first movement axis, and
   repeatedly performs the process in the second movement axis until completion.

3. The laser device of claim 2, wherein
   the control part completes the measurement of the plurality of image contrasts on the plurality of points on the first movement axis and the second movement axis of the light distribution part, and
   the control part determines the optimal position of the light distribution part.

4. The laser device of claim 3, wherein the control part determines points of the plurality of points having a maximum image contrast value within the first movement axis and the second movement axis of the light distribution part as the optimal position of the light distribution part on the first movement axis and the second movement axis, respectively.

5. The laser device of claim 1, further comprising:
   an f-theta lens disposed between the optical path adjustment part and the light distribution part and adjusting a focus of the laser beam.

6. The laser device of claim 5, wherein the control part adjusts the arrangement of the optical path adjustment part and adjusts positions of the plurality of sub-beams irradiated to the substrate in a raster scan method.

7. The laser device of claim 1, wherein the substrate includes reference patterns in which patterns having a same shape are periodically arranged on a surface of the substrate.

8. The laser device of claim 7, wherein the substrate is included in a flat panel display.

9. The laser device of claim 1, wherein the control part adjusts an intensity of the laser beam emitted by the light source part.

10. The laser device of claim 1, wherein
    the light distribution part splits the first laser beam into a plurality of sub-beams, and
    an intensity of each of the plurality of sub-beams of the first laser beam is smaller than or equal to a damage threshold of the substrate.

11. The laser device of claim 1, wherein
    the light distribution part includes a refraction beam splitter, and
    the optical path adjustment part includes a galvanometer or a polygonal mirror scanner.

12. The laser device of claim 1, wherein the sensing part senses a sub-beam of the plurality of sub-beams reflected from the substrate.

13. The laser device of claim 12, wherein the sensing part includes a photodiode that senses the sub-beam of the plurality of sub-beams.

14. The laser device of claim 1, wherein the sensing part senses a sub-beam of the plurality of sub-beams transmitted through the substrate.

15. A method of aligning a laser device, the method comprising:
    adjusting a position of a light distribution part according to a signal of a control part by a drive part;
    detecting a plurality of sub-beams transmitted through or reflected from a substrate by a sensing part;
    recording a plurality of signals detected by the sensing part for each position of the light distribution part;
    aggregating the plurality of signals for each of a plurality of rows and columns to generate a plurality of graphs representing the detected signals for each row and column;
    converting the plurality of graphs into graph signals;
    generating an image using a raster scan method by dividing into rows/columns and converting signals row by row based on the plurality of signals recorded by the control part; and
    measuring a difference in brightness between a brightest portion and a darkest portion of the image and recording an image contrast by the control part.

16. The method of claim 15, further comprising after the recording of the image contrast, recording a plurality of image contrasts for all positions of the light distribution part by repeatedly performing the adjusting of the position of the light distribution part, the detecting of the plurality of sub-beams, the generating of the image, and the recording of the image contrast.

17. The method of claim 16, further comprising, after the recording of the plurality of image contrasts for the all positions of the light distribution part,
  moving the light distribution part to a position having a maximum image contrast value of the plurality of image contrasts.

18. The method of claim 15, wherein the adjusting of the position of the light distribution part includes repeating a process of:
  sequentially moving the light distribution part in a movement axis among a plurality of movement axes of the light distribution part; and
  sequentially moving the light distribution part in a next movement axis among the plurality of movement axes of the light distribution part by the drive part.

19. The method of claim 18, wherein the plurality of movement axes include:
  a distance movement axis that adjusts a distance between the light distribution part and the substrate; and
  an angular movement axis that adjusts an angle between the light distribution part and the substrate.

20. The method of claim 15, wherein the method further comprises: emitting, by a light source part, a first laser beam having a first intensity for aligning the light distribution part; and emitting, by the light source part, a second laser beam having a greater intensity than the first intensity for laser processing the substrate.

* * * * *